United States Patent Office 3,219,599
Patented Nov. 23, 1965

3,219,599
METHOD FOR SOLIDIFICATION AND FOAM-ING OF RUBBER LATICES
Paul Stamberger, Baltimore, Md., and Walter M. Fuchs, deceased, late of Aachen, Germany, by Frieda W. Fuchs, sole heir, Aachen, Germany; said Frieda W. Fuchs assignor to Crusader Chemical Co., Inc., New York, N.Y., a corporation of New York
No Drawing. Filed Oct. 2, 1961, Ser. No. 148,783
9 Claims. (Cl. 260—2.5)

This application is a continuation in part of a copending U.S. application, Serial Number 681,185, of August 30, 1957, now U.S. Patent No. 3,006,868, for Method of Producing Foamed Rubbers, which was filed during copendency of U.S. patent application, Serial Number 401,735, filed December 31, 1953, now U.S. Patent No. 2,984,639, and the benefit of the earlier filing dates to which the here cited prior patent applications are entitled, is claimed as to the common subject matter under 35 U.S.C. 120.

The present invention relates to a method for solidifying liquid colloidal dispersions of natural or synthetic rubber-like substances, more particularly to a method for setting foamed dispersions of natural and synthetic latices to solid cellular sponge-like structures.

In the copending application cited, it was shown that coagulation or gelling of natural and synthetic latices can be enhanced by the formation or incorporation of an insoluble cationic long chain compound, especially quaternary ammonium salts, with soap forming fatty acids. In these compounds one of the substituents on the nitrogen has more than ten carbon atoms in the chain. This procedure has no influence on the stability prior the addition of a coagulant. However, the rate of coagulation or solidification with such coagulant is greatly accelerated in the presence of the above addition. This process of using the quaternary cationic compound in the manner described was applied very successfully in the process of gelling foam latices to cellular foam sponges.

An object of the present invention is to improve the process of solidifying liquid colloidal dispersions of substances having properties of rubber.

Another object of the invention is to improve in the process here mentioned the step of setting foamed dispersions of natural and synthetic latices to solid cellular sponge-type structure.

Still another object of the invention is to produce synthetic sponge-type latex products by gelation.

Yet another object of the invention is to improve the physical properties of sponge latex foam products, in particular its load bearing properties.

The products used in the copending application are substances of low solubility in water which do not produce positively charged ions in a quantity sufficient to be adsorbed on colloidal surfaces to result in coagulation. Hence, they will not destabilize or coagulate the latex compound until by some outside influence they are changed by a chemical reaction and one of the reaction products becomes a coagulant. This chemical reaction is produced by coagulating substances such as acids, bivalent ions, etc. These coagulants can be used, for example, in the process of dipping. The coagulant can be deposited first on a mold, which subsequently is dipped into the latex compound. To gel and solidify a mass of rubber latex, conventional type of delayed action coagulants may be used. Such coagulants are: Sodium silico fluoride or complex salts of bivalent or trivalent ions, such as ammonia complexes of zinc, zirconium, etc. The latter decompose on heating and are known as heat gelling agents. In accordance therewith, the present invent employs for its purposes materials which belong in the following classes:

(1) Salts of quaternary ammonium compounds, in which one substituant on the nitrogen has more than ten carbon atoms in the chain and the anion used for the salt formation, produces a compound of low solubility in water. Thus, only limited quantities of positive coagulant ions are available, which can not coagulate the negatively charged rubber latices. Such anionic agents are soap forming fatty acids, rosin acids, naphthenic acids, phenols, chlorinated phenols, dithiocarbamic acids.

(2) Salts of quaternary ammonium compounds which have also low solubility, where two or three of the alkyl substituents have six or more carbon atoms in the chain, such as dihexyldiethyl ammonium salts, trihexylmethyl ammonium salts, dioctyl-didecyl or hexyl-nonylbenzyl-dimethyl ammonium salts, or any combination of longer or shorter substituent chains attached to the nitrogen, or to an aromatic radical if the aromatic radical is the primary substitutent on the nitrogen atom. The shorter alkyl chains attached to the nitrogen have a lesser plasticizing effect on the finished rubber product than the longer ones. The load bearing characteristics of natural or synthetic cellular latex sponges therefore are higher at the same density than with the longer chain substituted quaternary additives. These cationic nitrogen derivatives may be added as salts of low solubility obtained with the anions above-mentioned, namely, such anionic agents as saturated and unsatuated soap-forming fatty acids having from 12 to 18 carbon atoms, rosin acids, naphthenic acids, phenols, chlorinated phenols, and dithiocarbamic acids. The limitations in selecting the alkyl, aryl, aralkyl substituents are in the properties and performance of the compounds which are obtained with it. The required properties of such a compound are that it yields a cationic colloidal ion readily adsorbed on the surface of a colloidal particle, either acting as a coagulant for the negatively charged colloid or reversing the charges. A further requirement is that the salts as used in the process, for example, with a soap forming fatty acid, have no coagulating effect when added to a latex compound.

(3) Cationic amine compounds with one, two or three alkyl substituents on the nitrogen, at least one of the substituents being a long alkyl chain, and the compound yielding positively charged colloidal ions in solution when soluble salts are formed. These cationic nitrogen compounds have low solubility per se and have no coagulating effect on the latex until they form a soluble salt with a mineral or organic acid. Such compounds can be added to the latex as emulsions, without destabilizing it.

To prevent coagulation on prolonged storage, the present application provides for use of the above cationic amine compounds in the form of a salt of low solubility obtained by their reaction with a suitable anionic material by the incorporation of an emulsion or dispersion of such a reaction product in the latex compound. If such latex is acidified with a mineral acid, or organic acid of low chain length, such as acetic acid or formic acid, there will be formed soluble salts dissociating in a cation consisting of the long chain nitrogen compound and the anionic radical of the acid, whereby the cation is a coagulant for the negatively charged dispersions.

These pounds are cationic in character and for the purpose of this invention interchangeable with the quaternary ammonium compounds. These products belong to the class of primary, secondary, or teritary amines. Tertiary amines are preferred because of their lower toxicity and lesser discoloration.

It should be understood that either the quaternary ammonium compounds or the cationic amine compounds according to the invention are capable of forming positively charged colloidal ions similar to the fatty acid components is a soap which forms negatively charged colloidal ions.

Instead of the quaternary ammonium derivatives, other onium derivatives are usable instead, or in conjunction with them such as phosphonium, selenium, sulfonium derivatives, having performance identical to the ammonium derivatives.

The following formula will demonstrate the type of products which can be used for the purpose of the present invention (listed above in above paragraphs 1 and 2).

wherein $R_1$ is of the group of alkyl, or aryl-alkyl radicals with a chain length of at least six i.e., 6 to 22 carbon atoms, such as hexyl or aryl hexyl. The chain can be straight or branched. $R_2$ depends to a large extent on the chain lengths of $R_1$. If in $R_1$ the alkyl substitutents have a chain length of more than ten carbon atoms, there is no limitation as to how short $R_2$ can be. However, if $R_1$ has a shorter chain length, $R_2$ should have at least six i.e., 6 to 22 carbon atoms in the alkyl radical. $R_3$ and $R_4$ can be hydrogen, alkyl, alkylol aryl-alkyl, or aryl, without limitation of the chain lengths.

A is an anion controlling the solubility of the quaternary cationic radical, for example, a soap forming fatty acid, rosin acid, naphthenic acid, dithiocarbamic acid, phenol, etc.

The following formulas characterize the products listed above in section 3.

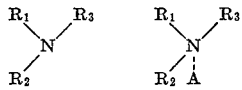

in which $R_1$ is a member of the group consisting of alkyl and aryl-alkyl radicals wherein the alkyl has a chain length of at least 8 carbon atoms, $R_2$ and $R_3$ can be hydrogen, short or medium chain length alkyl and A an anion of the class of soap forming fatty acids, rosin acids, naphthenic acids, in general, acids which yield a product of low solubility in water. The N can be part of a heterocyclic ring. Examples of such products are: Dodecyl benzyl methyl amine, dodecyl amine, dodecy hexyl methyl amine, dodecyl dimethyl amine, n-dodecyl-propylene diamine, t-octyl amine, n-octyl amine, or their diamines, furthermore, di-t-octyl amine, di-t-nonyl amine, and octyl dimethyl amine.

It is preferable to use their salts, however, with the soap forming fatty acids of the group of oleates, ricinoleates, furthermore, rosinates, naphthenates, or dithiocarbamates and equivalents. The higher members of this series, such as the dodecyl alkyls are sufficiently insoluble in water, so that they can be used without forming a salt with the above mentioned fatty acids, and are used preferably as an emulsion in water or dilute alkali. t-Octyl or nonyl amine, or a commercial product, sold under the trade name of Primene 81–R and JM–T made by the Rohm & Haas Company, can be made into a stable emulsion by mixing it with a 5% ammonia solution, when for example, into 5 parts of the ammonia solution, heated to 50° C., 25 parts of the amine is stirred in with a high speed stirrer.

A dilute soap solution, such as a potassium oleate or ricinoleate can be used, instead of ammonia, to produce the emulsion. A 25% active emulsion, thus obtained, can be added to the latex compound, prior or during the foaming operation. To produce the reaction product with the soap forming acid or with its equivalent, the amine and the acid are mixed together according to their combining weight or in any desirable proportion. It is preferable to use in excess the soap forming fatty acids or their equivalents. Thus, an emulsion can be prepared by mixing such a compound formed by reacting the amines and the acids with a dilute alkali solution after which a stable emulsion is formed. A high speed stirring is a suitable step to carry out the emulsification.

It has been found that by the use of a secondary gelant, as set forth in this invention, the sensitive and time consuming procedure of maturation of the natural latex compound can be eliminated and the solidification into a latex foam by gelation without change of the foam structure either by heat or by the action of the delayed action coagulants can be achieved.

With synthetic elastomeric latices such as polybutadienes, butadiene-styrene copolymers, butadiene-acrylonitrile co-polymers, polychlorobutadienes, etc., the tendency toward collapse or excessive shrinkage during gelation is much greater than with the natural latex and thus the effectiveness of the cationic additives (secondary gelant) is much more pronounced.

The various synthetic latices available behave quite differently. Listed below are the properties of two synthetic latices used for the tests.

(a) Pliolite latex, 5352 (Goodyear Tire and Rubber Co.):

Type— Butadiene-styrene
- Monomer ratio _____ 70/30.
- Total solids _____ 69%.
- Brookfield viscosity, cps. _____ 1500.
- Brookfield viscosity @ 60% T.S., cps. ___ 140.
- Mooney viscosity, ML _____ 135.
- pH _____ 10.2.
- Surface tension @ 40% T.S., dynes/cm. _____ 30.
- Bound styrene _____ 24%.
- Residual styrene _____ 0.02%.
- Coagulum _____ 0.02%.
- Average particle size,[1] angstroms _____ 3000.
- Specific gravity of latex solids _____ 0.946.
- Latex, lbs./gal. _____ 7.9.
- Solids, lbs./gal. _____ 5.4.
- Mechanical stability _____ Excellent.
- Stabilizer _____ Fatty acid.
- Antioxidant _____ None.

[1] Average particles size distribution.

(b) Firestone FR-S 200 latex (Firestone Tire and Rubber Co.):

Type: Butadiene-styrene
- Total solids _____ 64% minimum.
- pH _____ 10.4.
- Residual styrene _____ 0.05%.
- Viscosity (cps.) _____ 1400.
- Emulsifier _____ Fatty acid soap.
- Mechanical stability _____ Very good.
- Color _____ Very mild.
- Odor _____ White.

EXAMPLE 1

Increased deposition rate on molds by using the coagulation dip process.

The coagulation dip process is well known in the art and is described, i.e., in U.S. Patents, Nos. 1,825,736 and 1,996,051. Formulas for coagulants are cited, i.e., in Noble, "Latex in Industry," second edition, Rubber Age, 1953, page 486. The following experiments demonstrate the difference in the rate of deposition in the presence of the cationic nitrogen compound added to the latex dispersion. The coagulant formula is cited below:

| | Grams |
|---|---|
| Calcium nitrate | 30 |
| Zinc nitrate | 30 |
| Ethyl lactate | 3 |
| Butyl lactate | 30 |
| Lactic acid | 8 |
| Methanol | 250 |

The dipping compound was made with the below cited formula:

| | Grams |
|---|---|
| Natural rubber latex, 60% solids; ammonia, reduced to 0.25% | 1800 |
| 5% KOH solution | 4.6 |

Zinc diethyl-dithiocarbamate, 50% dispersion ____ 9
Zinc mercapta-benzothiazol, 50% dispersion _____ 18
Zinc oxide, 50% dispersion _____ 36
Sulfur, 60% dispersion _____ 18
Antioxidants, 50% dispersion _____ 22

The cationic nitrogen derivative used in the dipping compound is below cited:

200 grams of a 20% potassium oleate solution of pH 10.5 and 12 grams dodecyl-trimethyl-ammonium chloride were mixed together. First, a precipitate formed, which passed into a turbid solution of low viscosity on stirring. The solution formed could be mixed with the latex compound without coagulation, and without adversely affecting mechanical storage stability. The coagulant was deposited on the mold, and in five minutes after the solvent in the coagulant evaporated, the mold was immersed in the latex compound and withdrawn after 60 seconds. The deposit formed by coagulation was dried and cured. It could be stripped and the thickness determined. The gauge is as below.

| Cationic additive: | Thickness, inch |
| --- | --- |
| 0 part | .012 |
| 1 part | .013 |
| 2 parts | .017 |
| 3 parts | .020 |
| 4 parts | .025 |

*Heat gelation of foamed latex*

A polychloroprene (neoprene latex Type 60, manufactured by the E. I. du Pont de Nemours and Co.): The neoprene latex had a solid content of 60%; all other ingredients but the soap were added as 50% water dispersions or solutions.

Neoprene latex, 166 parts water dispersion 100 pts. solids;
Castor oil sodium soap, 10% parts water dispersion, (20% sol.) 2 pts. solids;
ZnO, 4 parts water dispersion, 2 pts. solids;
Antioxidant, 4 parts water dispersion, 2 pts. solids;
Sulfur, 4 parts water dispersion, 2 pts. solids;
Tepidone (sodium dibutyl-dithiocarbamate, 3 parts water dispersion, 1.5 pts. solids;
Hydrated alumina, 20 parts water dispersion, 10 pts. solids;

The solid content of the compound was 52%, the pH 10.8.

100 grams of this compound was again foamed in a Hobart beater and after the foam volume of 5 times the original obtained, the gelling agent —7 ml. of a 20% dispersion of sodium silico fluoride was added. The foam temperature was 75° F. The mixing time with the gelling agent was again 2 minutes at a low speed. After the foam was poured out into a container it set in 8 minutes, showing considerable shrinkage and quite a concave surface; the shrinkage thus could not be determined accurately, but was in excess of 30%.

EXAMPLE 1b

A solution of the quaternary ammonium compound prepared as follows:

415 parts by weight of octadecyl benzyl dimethyl ammonium chloride was dissolved in 2000 parts water. To this a solution of 305 parts sodium oleate in 1000 parts water was added, a precipitate was formed which went into dispersion by adding a solution of 600 parts sodium oleate in 1000 parts of water. The solution had a solid content of 24.5%.

EXAMPLE 1c 100 grams of neoprene latex compound as stated above, in the paragraph immediately following the heading "Heat gelation of foamed latex" was mixed with 3 ml. 20% solution ammonium nitrate and foamed up, during the foaming operation 10 grams of a 50% ZnO dispersion was added and continued to be mixed in the beater for 5 more minutes. After this, 2 ml. of a 20% dispersion of potassium silico fluoride was added and the contents of the beater poured into a mold. The mold content was heated to 170° F., the foam began to collapse in 10 minutes. No useful product could be obtained. The remaining latex foam which slowly collapsed in the beater remained liquid for 8 hours at room temperature.

EXAMPLE 1d

When 20 grams of the quaternary ammonium compound solution in Example 1b was added, the foam when heated to 170° F. solidified without any change in 10 minutes and after cure it showed good texture and a shrinkage of only 14%.

EXAMPLE 2

*The effect of the cationic secondary coagulant on the physical properties of cellular foam of natural latex products*

It is known in the art that to produce a stable foam, the processing of a compound has to be carried out in various steps. And, such a compound can only be used for a limited period of time. Before such time, the foam collapses on gellation. A maturation period of uncertain and empirical duration is one of the steps in preparing latex compounds which may give a satsifactory cellular structure. Such a matured latex compound can only be used for a limited period of time after which again a collapse of the foam during gellation may take place. The use of secondary gelants, as suggested in the parent case, Ser. No. 681,185, enables the use of the latex compound immediately, without maturation and any time later. In the present application, secondary gelants of the class of cationic nitrogen compounds are suggested where the chain lengths of the substituents on the nitrogen are shorter; thus no plasticizing effect of a long alkyl chain is noticeable. In the following tests the difference in the load bearing characteristics of the cellular products with different secondary gelants are shown. The same formula as in Example 1, page 4, of the parent case, Serial Number 681,185, is used as cited below:

*Natural rubber latex*

To a natural rubber latex containing 0.7% $NH_3$ was added a 15% potassium oleate solution, and the latex deammoniated by blowing air at 80° F. over the surface for 40 hours; the resulting latex contained 0.2% $NH_3$ and 0.5% potassium oleate. 163 pounds of this deammoniated latex, containing 100 pounds of rubber solids, was further compounded with a slurry consisting of:

| | Lbs. |
| --- | --- |
| Sulfur | 2 |
| Zinc salt of mercaptobenzothiazol | 1.5 |
| Zinc salt of diethyldithiodicarbamic acid | 0.5 |
| Antioxidant | 1 | previously ground in a solution consisting of 5 pounds of water to which was added 1½ ounces of Darvan 1 (sodium salt of polymerized alkyl aryl sufonic acid, Dewey and Almy Chemical Co.) by pouring the slurry into the latex. A further 13 pounds of 15% potassium oleate solution was added. This latex ready for foaming contained 57% solids.

The secondary gelants were 15% dispersions of (a) dodecyl trimethyl ammonium oleate in water, and (b) octyl trihexyl ammonium oleate in water. In either case, six milliliters of the secondary gelant dispersion has been used for 100 grams of the latex compound. The latex was beaten to twenty times of the original volume and poured in a mold for gelation and curing. After drying the density of the foam was 3.6 lbs. per cubic foot and the load bearing characteristics expressed as the RMA compression moduli at twenty-five percent compression determined according RMA standard ASTM specification D1055–58aT, was as follows: with the dodecyl alkyl substituted product, 12 lbs.; with the octyl alkyl substituted product, 14.5 lbs. The above shows that the plurality of shorter alkyl substituents is more desirable than a single long chain substituent.

The experiment was also carried out as a control, i.e., without the cationic gelling agent. It showed partial collapse during gelling, with a very coarse texture, which cannot be used as a cushioning material.

EXAMPLE 3

The use of dodecyl trimethyl dithiocarbamate as a secondary cationic gelling agent and preparation of the dithiocarbamate salt. A commercial coco trimethyl ammonium chloride which has an equivalent weight 264, was mixed with sodium dibutyl dithiocarbamate with an equivalent weight of 227 in stochiometric proportions in a 10% solution. After mixing the reaction product separated as an oily layer which could be removed and washed in water until the sodium chloride impurities formed during the reaction were nearly removed.

The reaction product, an oily liquid, was dispersed with a 20% oil fatty-acid potassium soap, using 5% soap on the reaction product. A slightly turbid dispersion formed which had a 20% active cationic content. A natural latex compound with the composition and properties described in Example 2, was used to test the foaming behavior. To 260 grams of the above compound (as described in Example 2), 8 milliliters of the 20% active dispersion was added and foamed in a Hobart mixer in conventional manner. The resulting foam sponge has a fine texture, and a very pleasing appearance. The control, without the secondary gelant, collapsed during gelation. The gel time in either case was 6 minutes. It was also found that the dodecyl trimethyl ammonium dibutyl dithiocarbamate is also a powerful vulcanization accelerator and in addition to enhancing the gelling characteristics, can be used as a vulcanizing accelerator in latex compounds.

EXAMPLE 4

Use of cationic nitrogen derivatives of the formulas:

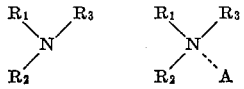

(A) Where the $R_1$ substituent was an octyl radical, i.e., t-octylamine: The amine, when added to the latex, caused coagulation. When the oleate was formed, a thickening in the latex occurred, and only after standing for several hours, coagulation took place. However, when the oleate was dispersed in a 10% ammonium solution, no destabilization of the latex was noticeable, thus, the dissociation of the salt was suppressed by the presence of $NH_4$ and $OH$ ions introduced with the ammonia. The preparation of the t-octylamine oleate was carried out by mixing of one mol of the t-octyl amine, equivalent weight 146 with one mol commercial oleic acid with a combining weight of 282. The reaction product was emulsified in 1.040 grams of 8% ammonium solution, and the result was a thick dispersion of 29.5% octyl amine content. This dispersion could be added to the latex without causing coagulation and was used in making foam rubber products.

(B) Also, dodecyl dimethyl amine, as in the formula in column 7, in which $R_1$ is a dodecyl radical, and $R_2$ and $R_3$ are methyl radicals, was taken as an example becaues of its low solubility in water, and its dispersion did not coagulate the latex, although, in the absence of ammonium hydroxide, or of KOH, local coagulation took place when added. Other long chain alkyl substituent cationic nitrogen derivatives of the same class, behaved in the same manner, such as, decyl-dimethyl amine, tridecyl dimethyl amine, n-dodecyl amine, n-coco morpholine. Their dispersions in a 2.5% soap solution with or without the presence of ammonium hydroxide, gave the best result. Instantaneous coagulations were caused by using the acetates or their salts with hydrofluoric acid, which were water soluble. The latter forms when sodium silicofluoride used as primary gelant hydrolyzes in the latex compound.

Oleates, recinoleates, naphthenates, and rosinates yielded insoluble products that could be prepared from the amine and the anionic portion by mixing both together according to their combining weights, preferably at elevated temperature, when each component liquified.

The resultant salt was not soluble in water. Thus, it had to be emulsified or solubilized, preferably in a soap solution. Such an emulsion did not cause destabilization of the latex compound and could be used successfully as secondary gelant to prevent collapsing during gelation.

EXAMPLE 5

As is was pointed out previously, that it is far more critical to use synthetic rubber latices for making foam latex products, since they have the tendency to collapse during gelation. The prepartion of a suitable latex compound is different because synthetic latices do not contain ammonia and do not require maturation. In this example, a butadiene-styrene co-polymer, Pliolite 5352, marketed by the Goodyear Tire and Rubber Company, was used. The formula is cited below:

| | Grams |
|---|---|
| Pliolite 5352, 70% solids | 1418 |
| Zinc mercapto benzothiazol, 50% dispersion | 30 |
| Zinc diethyl dithiocarbamate, 50% dispersion | 9.1 |
| Sulfur, 68% dispersion | 29.4 |
| Wingstay S, 30% emulsion (antioxidant styrenated phenol) | 50 |

A Hobart mixer was used and for each experiment 160 grams of the above latex compounds were added into the bowl. After the foam volume was reached, and zinc oxide dispersion, with 50% solids, 8 grams, the secondary gelant with 11.5% active ingredients and sodium silicofluoride 50% dispersion, 6 grams was added. The foam was poured into the mold in which it was allowed to set, vulcanized, washed and dried after which the appearance was noted. The following table represents the experiment and properties of the foam.

EXPERIMENT AND PROPERTIES OF THE FOAM

| Cationic Gelant | Amount used on 100 gram Latex Solids | Type of Gelling | Foam Texture |
|---|---|---|---|
| None | | Total collapse | |
| N-cocopropylene-diamine, 11% disp. in 2% NH$_4$OH Sln | 0.7 gram | Slow | Fine, shrinkage 30%. |
| t-Octylamine oleate, 25% emulsion in 5% soap solution | 2.5 grams | Sharp, total mass gelled at once | Fine, shrinkage 17%. |
| t-Octylamine oleate emulsion of 25% in 5% soap solution | 1.25 grams | Sharp, surface gelled 1st | Fine, shrinkage 22%. |
| t-Octylamine oleate emulsion in 2% NH$_4$OH | 1.25 | Sharp, few flocks formed in the beater | Fine, shrinkage 15%. |
| Primene [1] 81-R, (RNH$_2$) R tert. C$_{12}$-C$_{15}$, alkyl isomers dispersed in 2% KOH | 0.80 | Sharp, total mass gelled | Fine, shrinkage 16%. |
| Primene [1] JM-5, RNH$_2$, R tert. C$_{18}$-C$_{24}$, disp. in 2% NH$_4$OH | 1.00 | Very sharp | Fine, shrinkage 14%. |
| Primene 8-K R-oleate disp. in 5% K oleate | 1.00 | Very sharp | Fine, shrinkage 17%. |
| Do-decyl dimethyl amine 25% disp. in K oleate | 1.00 | Sharp | Very fine, shrinkage 14%. |

[1] Denotes that Primene is marketed by the Rohm Haas Company, of Philadelphia, Pennsylvania.

The cationic agent is added into the latex preferably after all other compounding ingredients are mixed in. The compound containing the ingredients is then used for the coagulation dip operation.

In processing cellular latex foam rubber, the cationic agent is added to the compound prior to the foaming; After that, ZnO and the primary gelling or coagulating agent are introduced during the step of foaming. The foam, subsequently, is poured into a mold, i.e., on a conveyor belt or textiles for coating, and allowed to set to a gel and cured afterward.

Instead of adding the preformed soap to the latex, the water-soluble quaternary ammonium halide may be added to latices containing excess of soluble soaps. However, extreme care must be taken that the quaternary salt be added slowly with vigorous agitation, in order not to get localized gelation. Furthermore, the amounts used must be kept at a minimum, in order not to cause coagulation. In general, therefore, we prefer not to use this variant, as being dangerous in unskilled hands.

It should be understood, of course, that the foregoing disclosure relates to only a preferred embodiment of the invention and that it is intended to cover all changes and modifications of the examples of the invention herein chosen for the purposes of disclosure, which do not constitute departures from the spirit and scope of the invention as set forth in the appended claims.

The expression "synthetic latices of rubbery butadiene polymers" is used herein as meaning and is intended to embrace the water dispersions of elastomers made from polybutadienes, from copolymers of butadiene with one or more co-monomers, such as butadiene-styrene and butadiene-acrylonitrile copolymers, and from polymers of substituted butadienes such as chloroprene and isoprene.

We claim:

1. A method for the solidification of negatively charged aqueous colloidal dispersions selected from the group consisting of natural rubber latices and synthetic latices of rubbery butadiene polymers, said method comprising:
   (a) incorporating in said negatively charged dispersion an auxiliary gelant consisting of a cationic nitrogen derivative of a sufficiently low water solubility not to coagulate the said negatively charged aqueous colloidal dispersion but which acts as a coagulant for said dispersion in the presence of a coagulant selected from the group consisting of mineral acids, non-soap-forming organic acids and salts of polyvalent ions, said cationic nitrogen derivative being selected from the group consisting of:
      (1) quaternary ammonium salts substantially insoluble in water and having the formula

wherein $R_1$ and $R_2$ are each selected from the group consisting of hydrogen, lower alkyl, lower alkylol, aryl-alkyl, and aryl, $R_3$ and $R_4$ are each members of the group consisting of straight chain and branched chain substituents having 6 to 22 carbon atoms, and A is the anion of a compound selected from the group consisting of soap-forming fatty acids, rosin acids, naphthenic acids, thiocarbamic acids and organic compounds which yield a product of low solubility in water with the cation portion of said quaternary ammonium salts;
      (2) polyquaternary ammonium salts of the formula:

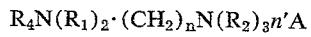

wherein $R_1$, $R_2$, $R_4$ and A respectively, have the same meaning as set forth in (1) above, $n$ is an integer from 2 to 10, $n'$ is an integer selected from one and two; and
      (3) an amine compound selected from the group consisting of primary, secondary and tertiary amines of the formula

and salts thereof of the formula

wherein $R_1$ is a member of the group consisting of alkyl and aryl-alkyl, $R_2$ is a member of the group consisting of hydrogen, alkyl and aryl-alkyl and $R_3$ is a member of the group consisting of hydrogen, alkyl, aryl-alkyl and aryl, and wherein $R_1$ has: (a) a chain length of at least 8 carbon atoms when $R_2$ and $R_3$ are each of a chain length of less than 6 carbon atoms, and (b) a chain length of at least 6 carbon atoms when at least one of $R_2$ and $R_3$ is of a chain length of at least 6 carbon atoms, and wherein A is the anion of a compound selected from the group consisting of soap-forming fatty acids, rosin acids, naphthenic acids, thiocarbamic acids and organic compounds which yield a product of low solubility in water with said amines as the cation portion of said amine salts; and
   (b) combining a selected one of said coagulants with said mixture of said negatively charged aqueous colloidal dispersion and the selected cationic nitrogen derivative.

2. The method as defined in claim 1, wherein said negatively charged aqueous colloidal dispersion is in the form of a foam and wherein said solidification thereof yields a solid cellular product.

3. A method of forming rubber articles on a mold from a negatively charged aqueous colloidal dispersion selected from the group consisting of natural rubber latices and synthetic latices of rubbery butadiene polymers, said method comprising applying to the mold a coagulant selected from the group consisting of mineral acids, non-soap-forming organic acids and salts of polyvalent ions, and subsequently applying to the thus coagulant-treated mold a selected one of said negatively charged aqueous colloidal dispersions and a cationic nitrogen derivative selected from the group defined in claim 1.

4. The method of manufacturing a rubber article which comprises making an aqueous emulsion of a cationic nitrogen derivative constituting a member of the group of quaternary ammonium salts defined in claim 1, said emulsion being made by mixing said cationic nitrogen derivative with water in the presence of an anionic surfactant as the emulsifying agent, thoroughly mixing and emulsion with a negatively charged aqueous colloidal dispersion selected from the group consisting of natural rubber latices and synthetic latices of rubbery butadiene polymers, and thereafter coagulating said mixture of said colloidal dispersion and said aqueous emulsion of cationic nitrogen derivative by adding to said mixture a coagulant selected from the group consisting of mineral acids, non-soap-forming organic acids and salts of polyvalent ions.

5. The method of manufacturing a sponge rubber article having uniformly distributed therein a water-insoluble cationic nitrogen derivative, from a negatively charged rubber latex, which comprises forming a stable aqueous emulsion of a cationic nitrogen derivative selected from the group thereof defined in claim 1 in an aqueous solution of a soap selected from the group consisting of ammonium, potassium and sodium salts of an acid selected from the group consisting of rosin acids and saturated and unsaturated soap-forming fatty acids having from 12 to 18 carbon atoms, thoroughly mixing the said emulsion of cationic nitrogen derivative with said negatively charged rubber latex, foaming the mixture by beating air into the same, and thereafter coagulating the said mixture in the foamed condition to form a cellular rubber article.

6. The method defined in claim 5 wherein said negatively charged rubber latex is selected from the group consisting of natural rubber latex, a latex obtained by emulsion polymerization of chloroprene and a latex obtained by emulsion polymerization of a butadiene.

7. The method as defined in claim 5, wherein the coagulation of said mixture is effected by incorporating a coagulating agent into said mixture prior to said foaming thereof.

8. A method for the solidification of a negatively charged aqueous colloidal dispersion selected from the group consisting of natural rubber latices and synthetic latices of rubbery butadiene polymers, said method comprising introducing into said aqueous colloidal dispersion a cationic nitrogen derivative comprising the reaction product of an amine compound selected from the group consisting of primary, secondary and tertiary amines and salts thereof formed with an acid selected from the group consisting of soap-forming fatty acids, naphthenic acids, rosin acids and thiocarbamic acids, said amine compound having one long alkyl chain of at least 8 carbon atoms, the other two substituents of said amine compound being selected from the group consisting of hydrogen, short chain alkyls and medium chain alkyls.

9. The method of manufacturing a rubber article which comprises making an aqueous emulsion of a cationic nitrogen derivative constituting a member of the group of amine compounds and polyquaternary ammonium salts defined in claim 1, said emulsion being made by mixing said cationic nitrogen derivative with water in the presence of an anionic surfactant as the emulsifying agent, thoroughly mixing said emulsion with a negatively charged aqueous colloidal dispersion selected from the group consisting of natural rubber latices and synthetic latices of rubbery butadiene polymers, and thereafter coagulating said mixture of said colloidal dispersion and said aqueous emulsion of cationic nitrogen derivative by adding to said mixture a coagulant selected from the group consisting of mineral acids, non-soap-forming organic acids and salts of polyvalent ions.

References Cited by the Examiner

UNITED STATES PATENTS

| | | | |
|---|---|---|---|
| 2,261,439 | 11/1941 | Kelly | 260—2.5 |
| 2,891,017 | 6/1959 | Kern et al. | 260—2.5 |
| 3,006,868 | 10/1961 | Stamberger et al. | 260—2.5 |

MURRAY TILLMAN, *Primary Examiner.*

LEON BERCOVITZ, *Examiner.*

UNITED STATES PATENT OFFICE
CERTIFICATE OF CORRECTION

Patent No. 3,219,599                          November 23, 1965

Paul Stamberger et al.

It is hereby certified that error appears in the above numbered patent requiring correction and that the said Letters Patent should read as corrected below.

Column 2, line 63, for "teritary" read -- tertiary --; line 70, for "is" read -- in --; column 4, line 48, for "Very mild" read -- White --; line 49, for "White" read -- Very mild --; column 8, line 6, for "caues" read -- cause --; line 17, for "were" read -- are --; line 20, for "recinoleates" read -- ricinoleates --; columns 7 and 8, in the table, footnote thereof, for "Rohm Haas" read -- Rohm and Haas --; column 10, line 57, for "and" read -- said --.

Signed and sealed this 18th day of October 1966.

(SEAL)
Attest:

ERNEST W. SWIDER                              EDWARD J. BRENNER
Attesting Officer                                    Commissioner of Patents